(12) United States Patent
Rohner et al.

(10) Patent No.: US 7,619,719 B2
(45) Date of Patent: Nov. 17, 2009

(54) PHASE NOISE COMPENSATION FOR INTERFEROMETRIC ABSOLUTE RANGEFINDERS

(75) Inventors: Marcel Rohner, Heiden (CH); Thomas Jensen, Rorschach (CH)

(73) Assignee: Leica Geosystems AG, Heerbrugg (CH)

( * ) Notice: Subject to any disclaimer, the term of this patent is extended or adjusted under 35 U.S.C. 154(b) by 186 days.

(21) Appl. No.: 11/816,825

(22) PCT Filed: Feb. 9, 2006

(86) PCT No.: PCT/EP2006/050797

§ 371 (c)(1), (2), (4) Date: Aug. 21, 2007

(87) PCT Pub. No.: WO2006/089845

PCT Pub. Date: Aug. 31, 2006

(65) Prior Publication Data

US 2008/0204698 A1    Aug. 28, 2008

(30) Foreign Application Priority Data

Feb. 23, 2005    (EP) .................................. 05101373

(51) Int. Cl.
  *G01C 3/08* (2006.01)
(52) U.S. Cl. .................... 356/4.09; 356/4.01; 356/5.01; 356/5.1
(58) Field of Classification Search .................. 356/4.09
  See application file for complete search history.

(56) References Cited

U.S. PATENT DOCUMENTS

| 4,830,486 | A | 5/1989 | Goodwin |
| 5,371,587 | A | 12/1994 | De Groot et al. |
| 6,360,609 | B1 * | 3/2002 | Wooh ........................... 73/602 |
| 2003/0095261 | A1 | 5/2003 | Gu |
| 2003/0107743 | A1 * | 6/2003 | Van Wiggeren ............. 356/477 |
| 2004/0130728 | A1 | 7/2004 | Degertekin et al. |
| 2009/0128395 | A1 * | 5/2009 | Baath ......................... 342/124 |

FOREIGN PATENT DOCUMENTS

| DE | 195 22 262 | 1/1997 |
| EP | 0 260 894 | 3/1988 |
| EP | 0 646 767 | 4/1995 |
| WO | WO 98/38475 | 9/1998 |

\* cited by examiner

*Primary Examiner*—Thomas H Tarcza
*Assistant Examiner*—Luke D Ratcliffe
(74) *Attorney, Agent, or Firm*—Workman Nydegger

(57) ABSTRACT

The invention relates to a method for interferometric absolute distance measuring by a frequency modulation electromagnetic radiation on at least one measurable target and for subsequently receiving a retransmitted radiation with a heterodyne mixture, wherein the radiation is guided in a parallel direction via a reference interferometric length. In such a way, a first digitized interferogram of the radiation retransmitted by the target and a second digitised interferogram of the radiation guided on the reference length are obtainable at a reception. According to phase progression data of the second interferogram, a virtual interferogram or a phase progression thereof is synthesized and the distance determination is carried out by comparing the progression face data of the first interferogram with the progression face data of the virtual interferogram.

19 Claims, 5 Drawing Sheets

PHASE NOISE COMPENSATION FOR INTERFEROMETRIC ABSOLUTE RANGEFINDERS

The invention relates to an absolute distance-measuring method according to the pre-characterizing clause of Claim 1, an absolute distance-measuring apparatus according to the pre-characterizing clause of Claim 13 and a computer program product.

In the area of electronic distance measurement, various principles and methods are known. One approach consists in emitting frequency-modulated electromagnetic radiation, such as, for example, light, to the target to be surveyed and subsequently receiving one or more echoes from back-scattering objects, ideally exclusively from the target to be surveyed, it being possible for the target to be surveyed to have both specular—for example retroreflectors—and diffuse back-scattering characteristics. In a heterodyne interferometer arrangement, a tuneable laser light source is used for the absolute distance measurement. In the embodiment which is simplest in principle, the optical frequency of the laser source is tuned linearly. The signal received is superposed with a second signal which is derived from the emitted light signal. The resulting beat frequency of the heterodyne mixed product, the interferogram, is a measure of the distance to the target object.

The wavelength of the emitted light signal represents the scale of the measurement. This is generally not known and has to be determined in an additional measurement. For this purpose, for example, a part of the emitted light is passed via a reference interferometer with a defined reference length. From the resulting beat product, it is possible to derive the wavelength change of the emitted light signal as a function of time on the basis of the known reference length.

The apparatuses used for implementing these methods usually use a laser as a signal source, which can be chirped by modulation of the external (for example Bragg grating) or internal cavity (for example distributed feedback (DFB) or distributed Bragg reflector (DBR)). Transmitting and receiving optical systems down-circuit of which a detector or quadrature detector for heterodyne mixing, A/D converter and digital signal processor are connected are used for emission and for reception in the optical range.

In the practical embodiment, there are generally several basic difficulties:

A linear tuning of the laser light source which is sufficient for the desired accuracy can be effected only with great effort.

The laser light sources, in particular semi-conductor laser diodes, have a strong phase noise, which is equivalent to uncontrolled variations of the scale length, which firstly greatly limits the measuring range, i.e. limits measurements to distances below the coherence length of the laser, and secondly causes strong fluctuations in the measurement which can be reduced only by long measuring times.

Movements of the target to be surveyed which take place during the measuring process as well as fluctuations of the measuring path cause additional frequency components in the interferometric mixed product, which can lead to large measurement errors.

The prior art discloses various approaches which are concerned with the problems associated therewith.

U.S. Pat. No. 4,830,486 describes a system of the generic type for absolute distance measurement. There, linearization of the frequency response curve is effected by control measures and phase noise suppression is effected by the choice of the arm length of the interferometer approximately in agreement with the target distance. Movements of the target to be surveyed during the measuring process can be discriminated by a suitable choice of the frequency response curve. The system makes it possible to measure targets having very low reflectivity but requires long measuring times for the required high accuracy of measurement. In addition, the requirement for an arm length of the reference interferometer of the order of magnitude of the distance to be measured leads to greater complexity or technical effort and high production costs.

DE 195 22 262 describes a system having two laser sources for the production of synthetic wavelengths. This means that the interferometric stability of the setup and of the target distance has to meet fewer requirements, but the system has greater complexity owing to the two laser sources.

US 2003/0107743 A1 describes a method for eliminating phase noise of the signal source. The method is used for surveying the group transit time of optical components with a large optical length. In the form described, it is not suitable for measuring absolute distances.

An object of the invention is to provide a solution which permits improved identification and a knowledge of the frequency response curve and/or a reduction or avoidance of the errors or the effects thereof for absolute rangefinders of the generic type. In particular, the tuning characteristic and the phase noise of the emitted laser light are to be characterized in a reference interferometer so that, in particular, non-linearity and noise can be taken into account algorithmically and the influence thereof on the accuracy of measurement can be eliminated.

A further object of the present invention is also to permit interferometric measurements beyond the coherence length.

These objects are achieved or the solutions further developed by the subjects of Claim 1 or 13 and of the dependent Claims, respectively.

According to the invention, the phase curve of a signal source is determined in a reference interferometer. The phase curve data determined are then used for practically eliminating the influence of the non-ideal properties of the laser source.

For a given frequency response curve of the emitted laser light $v(t)$, the phase curve of the heterodyne signal of the reference interferometer with a length (difference between the arm lengths) of $R_r = c \cdot \tau_r/2$ was given by $$\Delta\phi_r(t_k) = 2\pi \cdot \int_{t_k-\tau_r}^{t_k} v(t)\,dt \tag{1}$$

In an ideal embodiment, this phase curve signal is sampled at the sampling points $t_k$ and digitized, where $$t_k = \alpha \cdot k \cdot \tau_r \tag{2}$$

and the correction factor $\alpha \approx 1$ models the deviation between sampling interval and lag time of the reference length. This means that the sampling interval ideally corresponds precisely to the known lag time of the reference length $\tau_r$. According to the invention, it may be advantageous to choose the sampling frequency as an integral multiple of the inverse lag time over the reference length.

The phase curve of the heterodyne signal of the measuring distance of the length (difference between the arm lengths) $R = c \cdot \tau_m/2$ is given by $$\Delta\phi_M(t_k) = 2\pi \cdot \int_{t_k-\tau_M}^{t_k} v(t)\,dt \tag{3}$$

According to the methods of the prior art, the distance to the target object R is obtained for a stationary target object by resolving the following relationship $$\frac{R}{R_r} \approx \frac{\Delta\phi_M(t)}{\Delta\phi_r(t)} \tag{4}$$

The evaluation of equation (4) can either be effected at a given time T—the end of the measuring interval—or formulated as an optimization problem.

In the strict sense, this relationship (4) is true only if one of the following conditions is fulfilled:

Linearity of the optical frequency response curve: This condition cannot be exactly fulfilled because of the tuning of the frequencies and because of the phase noise.

The target distance R corresponds to the reference length: $R=R_r$.

According to the prior art, the latter means that a reference interferometer with corresponding length would have to be available for each desired target distance. This is obviously possible in practice only in special cases or achievable only with great effort.

In contrast to equation (4), a phase curve equivalent to the measuring interferometer (with any desired target distance) is synthetically produced, according to the invention, from the measurement of the phase curve data of a reference interferometer (with a short length in relation to the coherence length of the emitted laser light). In the simplest embodiment, $$\Delta\phi_{m\cdot r}(t_k) = \alpha \cdot \sum_{j=k-m+1}^{k} \Delta\phi_r(t_k) \tag{5}$$

is applicable for this purpose, where $R \approx m\cdot\alpha\cdot R_r$, as required for the validity of the relationship (4).

The term "synthetically" differs here fundamentally from the term customary in the area of multi-wavelength interferometry. In this area, the distance information is determined via the frequency difference of different coloured optical signals which produce a "synthetic" beat frequency. There, the term "synthetically" means that only (measurable) frequency differences are employed. In the context of the present invention, on the other hand, "synthetically" designates a purely theoretical, non-measurable quantity, i.e. for example the virtual interferogram or the phase curve thereof is determined computationally.

The relationship (4) is now $$\frac{R}{m\cdot\alpha\cdot R_r} \approx \frac{\Delta\phi_M(t)}{\Delta\phi_{m\cdot r}(t)} \tag{6}$$

and is fulfilled with high accuracy for any desired curve of the tuning of the laser frequency and phase noise. Substituting equation (5) into equation (6) also shows that the correction factor α can be eliminated. The unknown parameter m, which expresses the length ratio between reference interferometer and measuring interferometer, is to be determined in the analysis of the measured data.

The accuracy of measurement of the arrangement can be further increased by replacing equation (5) by an interpolation formula of the following type $$\Delta\phi_{m\cdot r}(t_k) = \alpha \cdot \left[ \sum_{j=k-m+1}^{k} \Delta\phi_r(t_j) + \frac{R - m\cdot\alpha\cdot R_r}{\alpha\cdot R_r}\Delta\phi_r(t_{k-m}) \right] \tag{7}$$

where m is now chosen so that $(m-1)\cdot\alpha\cdot R_r \leq R \leq m\cdot\alpha\cdot R_r$.

It is possible according to the invention to carry out measurements outside the coherence length of the laser. In this case, the phase curve degenerates over the measuring distance to a noise process. The formation of the synthetic phase curve of a virtual measuring distance now produces a correlated noise process. The target distance is determined by the numerical search for a correlation maximum.

For evaluation of the phase curve data, the resolution of the relationship (6) is advantageously replaced by an optimization problem of the following type $$\min_R \left[ \frac{R}{m\cdot\alpha\cdot R_r}\Delta\phi_{m\cdot r}(t) - \Delta\phi_M(t) \right]^2 \tag{8}$$

According to the invention, this optimization can also be carried out as an approximation in order to simplify the system.

The relationships (6) and (8) assume that both the phase curve of the reference interferogram and that of the measuring interferometer can be determined. In general, this is true for the reference measurement. The measurements over the measuring distance are, however, often so strongly contaminated with noise that the phase cannot be determined from the measurement of the heterodyne signal $s(t) \approx A\cdot\cos(\Delta\phi_M(t))$. In this case, for determining the target distance, an optimization problem is solved directly for the measured signal amplitude of the interferogram—instead of for the derived phases $$\min_{\overline{A},\overline{R}} \left[ \overline{A}\cdot\cos\left( \frac{\overline{R}}{m\cdot\alpha\cdot R_r}\Delta\phi_{m\cdot r}(t) \right) - s(t) \right]^2 \tag{9}$$

According to the invention, this optimization can be carried out as an approximation in order to simplify the system.

On movement of the measured object with a velocity V in the measuring direction, the phase curve of the heterodyne signal of the measuring interferometer of the length R is given by $$\Delta\phi_M = 2\pi \cdot \left[ \int_{t_k-t_m}^{t_k} v(t)\,dt + \frac{V\cdot t}{\lambda} \right] \tag{10}$$

This leads to an incorrect distance determination (Doppler effect) if the movement is not taken into account in the analysis of the measured data. According to the invention, the movement of the measured object is taken into account by introducing a movement model V(t;θ) with velocity parameters θ to be determined in the optimization problem of the phase curve data of the following type $$\min_{\bar{R},\bar{\theta}}\left[\frac{\bar{R}}{m\cdot\alpha\cdot R_r}\Delta\phi_{m\cdot r}(t)-\Delta\phi_M(t)+2\pi\frac{V(t;\bar{\theta})\cdot t}{\lambda}\right]^2 \quad (11)$$

In the case of signals strongly contaminated with noise, an optimization problem is solved directly for the measured signal amplitudes of the interferogram—instead of for the derived phases—for determining the target distance $$\min_{\bar{A},\bar{R},\bar{\theta}}\left[\bar{A}\cdot\cos\left(\frac{\bar{R}}{m\cdot\alpha\cdot R_r}\Delta\phi_{m\cdot r}(t)+2\pi\frac{V(t;\bar{\theta})\cdot t}{\lambda}\right)-s(t)\right]^2 \quad (12)$$

According to the invention, it is also possible to use other movement models. According to the invention, this optimization can also be carried out as an approximation in order to simplify the system. Under conditions which are known to be stable with respect to interferometry, it is possible to dispense with the determination of the velocity parameter.

The approximation can be effected by various approaches. In particular, a simplified movement model of constant velocity θ=v, with V(t;θ)=v can be used. The determination of the integral relation $\tilde{m}$ and of the distance $\tilde{R}$ to be determined can also take place sequentially or the determination of the variation of the emitted laser light γ(t) as a function of time can be dispensed with. For avoiding the 2π ambiguity in the determination of the phase of the interferograms, an optimization for the difference phases $\Delta\phi_M(t_k)-\Delta\phi_M(t_{k-1})$ and $\Delta\phi_{m\cdot r}(t_k)-\Delta\phi_{m\cdot r}(t_{k-1})$ can be effected instead of optimization for the phase curve data according to equations (8) and (11). In the case of interferograms strongly contaminated with noise, the optimization for the signal amplitudes of the interferogram according to equation (12) can be reduced to an optimization for the phase curve data according to equation (11) by suitable filtering.

Both the length of the reference interferometer and the sampling interval of the digitizing determine the relative accuracy of measurement of the rangefinder. While electronic oscillators with ppm accuracy are available, the stabilization of the reference length constitutes a major problem.

According to the invention, the problem can be solved by stabilizing the reference length by constructive measures or calibrating it by means of an inherently temperature-stable or temperature-stabilized element, such as, for example, a gas cell or a temperature-stabilized etalon. For this purpose, the transmission extremes are determined by said element simultaneously with the measurement of the phase curve of the reference interferometer during the tuning of the laser frequency. The frequency separation Δν of these extremes is very accurately determined by the design of the element. The total phase change of the reference distance phase curve during the cycle $t_1$, $t_2$ of the transmission extremes, $\Delta\phi=\Delta\phi_r(t_2)-\Delta\phi_r(t_1)$, is now a measure of the reference length $$R_r=\frac{\Delta\Phi\cdot c}{4\pi\cdot\Delta v} \quad (13)$$

This measurement can be carried out simultaneously or sequentially with the measurement to the target object. For a simultaneous measurement, the accuracy of measurement can be improved by filtering—assuming slow fluctuations of the reference length. The influence of the phase noise on the calibration of the reference length can thus be strongly suppressed without further measures.

By means of the approach according to the invention, it is now possible to set lower requirements with regard to the linearity of the frequency tuning as well as with regard to the line width of the laser source used, in comparison with the prior art. Moreover, the measuring range is not limited by the laser coherence length, and the accuracy of measurement can be maintained even at high measuring rates. It is thus possible to use an easily realisable, economical laser source with corresponding cost benefit of the overall system in combination with high accuracy of measurement, long measuring range and high measuring rate.

The absolute distance-measuring method according to the invention or the absolute distance-measuring apparatus according to the invention are described or explained in more detail purely by way of example below with reference to working examples shown schematically in the drawing. Specifically, FIG. 1 shows a schematic diagram of the basic measuring setup;

Figure 1:
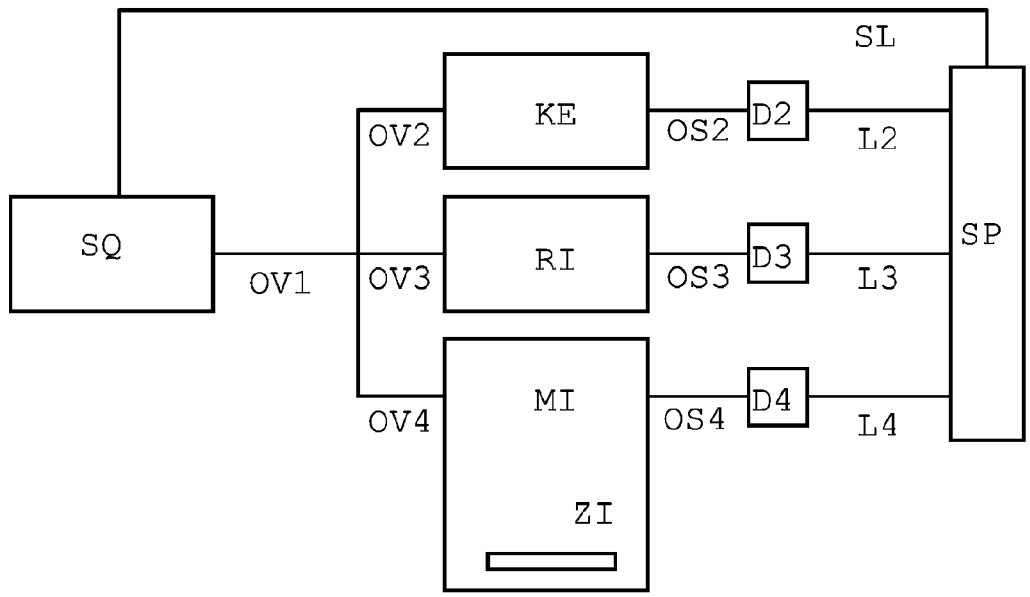

FIG. 1 shows the basic measuring setup. The signal source SQ is coupled into the measuring interferometer MI, the reference interferometer RI and the optional calibration unit KE via the optical connections OV1-OV4. The target ZI to be surveyed is part of a measuring interferometer during the measurement. The signals are transmitted to the detector units D2, D3 and D4 via the optical distances OS2, OS3 and OS4. Detector signals are fed to the signal processor SP via the electric cables L2, L3 and L4. The signal processor SP performs the processing and evaluation of the signals and also controls the signal source SQ via the control line SL.

Figure 2:
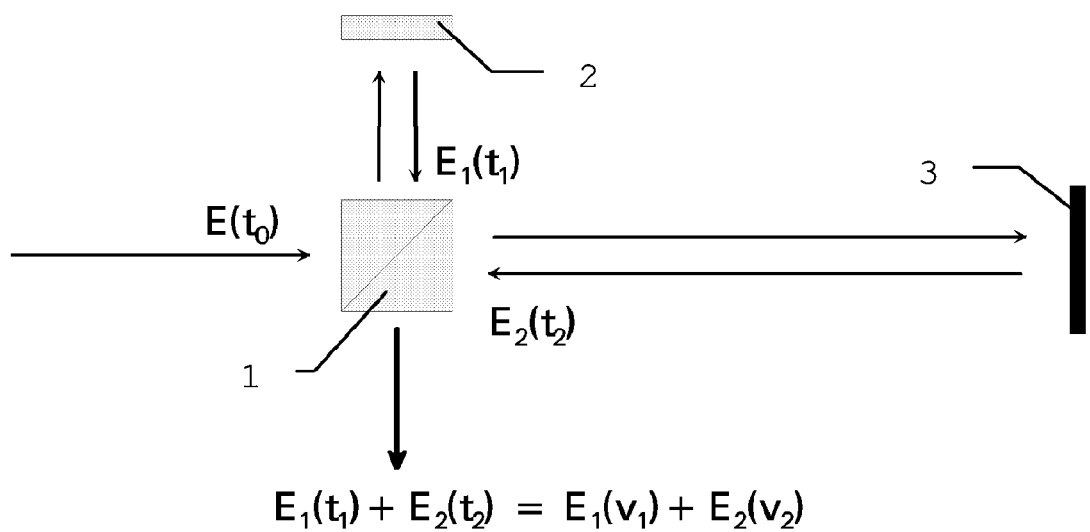
FIG. 2 shows the schematic diagram of the formation of the heterodyne mixed product between emitted light signal and light signal reflected by the target.

FIG. 2 shows the schematic diagram of an interferometer for the formation of the heterodyne mixed product. Part of the light emitted is coupled out via the beam splitter 1 and, after reflection at reflector 2 and passage through the beam splitter, is superposed with the light signal scattered back from reflector 3. For interferometric absolute distance measurements, tuneable laser sources are used. In the embodiment which is simplest in principle, the time-dependent emission thereof satisfies the equation $v(t)=v_0+\gamma t$. The superposition of the two E-fields delayed by the distances covered produces the heterodyne frequency f.

$$f=v(t_2)-v(t_1)=(v_0+\gamma t_2)-(v_0+\gamma t_1)$$

where $t_1=2L_1/c$ and $t_2=2L_2/c$ $$f = \frac{\gamma 2R}{c}$$

and $R=L_2-L_1$ (difference between the distances)

This fundamental relationship links the distance to be measured with the carrier signal of the heterodyne frequency f.

Figure 3:
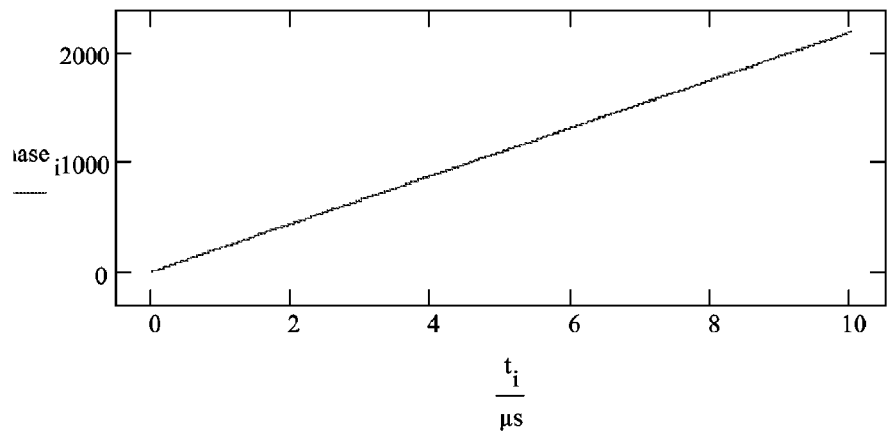
FIG. 3 shows the diagram of the phase of an interferogram recorded by a quadrature receiver.

FIG. 3 shows the phase of an interferogram recorded by a quadrature receiver. For an example where $\gamma=40$ GHz/ms and L=40 m, f=10.7 MHz follows as the heterodyne frequency of the measurement. On the detector, the intensity of the received signals is $$I=(E_1+E_2)\cdot(E_1+E_2)^*$$

$$I=E_1^2+E_2^2+2E_1E_2\cdot\cos(2\pi ft).$$

This received intensity is the basis of signal processing. In the case of an undisturbed signal, the carrier frequency can be obtained directly by a Fourier analysis, so that the distance to be determined can be calculated directly. In reality, however, the signals are disturbed so that it is advantageous to measure the phase φ of the oscillating intensity directly by an optical quadrature receiver. In the case of a perfect measurement, the linear curve $$\frac{\Delta\phi}{\Delta t} = f$$

is applicable.

The phase thus increases linearly as a function of time—as shown in FIG. 3.

Figure 4:
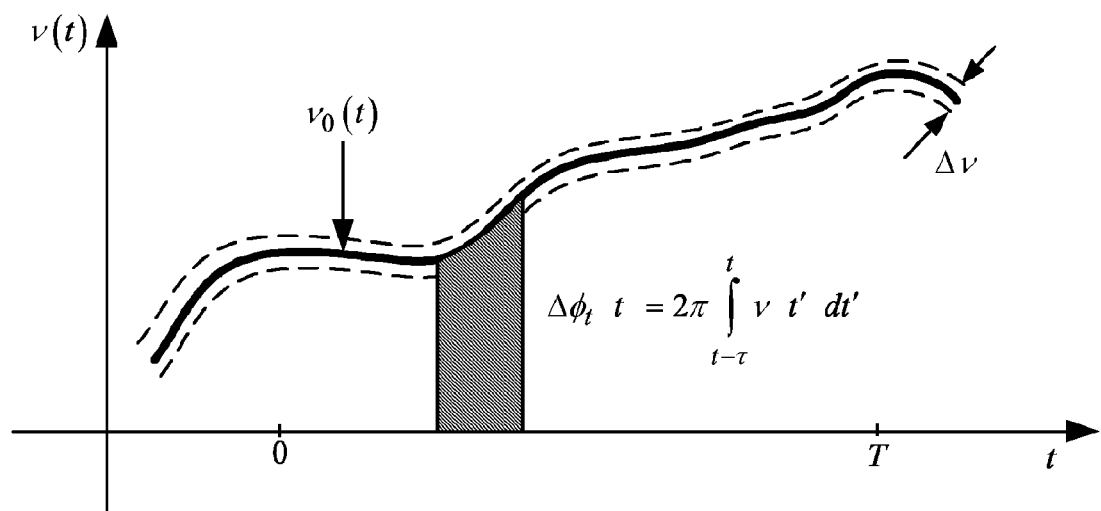
FIG. 4 shows the diagram of the frequency response curve of a mono frequency signal with time integration window.

FIG. 4 shows the frequency response curve of a mono frequency signal. In addition a time-related integration window according to equations (1) and (3) is shown. An interferometer detects the phase change between emitted signal e(t) and the signal r(t) received again after passage over a distance. In order to define the measurement of the phase change, a mono frequency signal or signal composed of a plurality of mono frequency components is used. This means that a characterization can be made on the basis of the signal amplitude E(t) and the instantaneous frequency ν(t), these varying comparatively slowly with reference to the measuring process:

$$e(t) = E(t)\cdot\cos\phi(t)$$

$$\frac{\phi(t)}{2\pi} = \int_0^t \nu(t')dt' + \frac{\phi_0}{2\pi}$$

Here,
e(t) denotes the emitted signal
E(t) denotes the signal amplitude
φ(t) denotes the phase of the emitted light [rad]
φ₀ denotes the phase offset [rad]
ν(t) denotes the instantaneous frequency of the emitted signal [Hz]

FIG. 4 shows an example of the time-dependent curve of the instantaneous frequency ν(t). Ideally, the received signal r(t) is a delayed and attenuated copy of the emitted signal e(t), the delay and attenuation being taken into account by the terms τ(t) and G(t):

$$r(t)=\sqrt{G(t)}\cdot e(t-\tau(t))\approx\sqrt{G(t)}\cdot E(t)\cdot\cos\phi(t-\tau(t))$$

The determination of the target distance is effected by the measurement of the phase change per revolution from the rangefinder to the target and back and hence of the phase change between r(t) and e(t):

$$\Delta\phi(t)=\phi(t)-\phi(t-\tau(t))$$

With the above assumption of only slow variations and neglecting possible velocity components, it follows that $$\frac{\Delta\phi(t)}{2\pi} = \int_{t-\tau(t)}^{t} \nu(t')dt' \approx \nu(t)\cdot\tau(t)$$
$$\tau(t)<<\nu(t)/\dot\nu(t)$$

This assumption $\tau(t)<<\nu(t)/\dot\nu(t)$ is true, however, only for the slow change of the frequency, as may be caused, for example, by the nonlinearity of the frequency response curve. The high-frequency noise components do not comply with this assumption.

Figure 5:
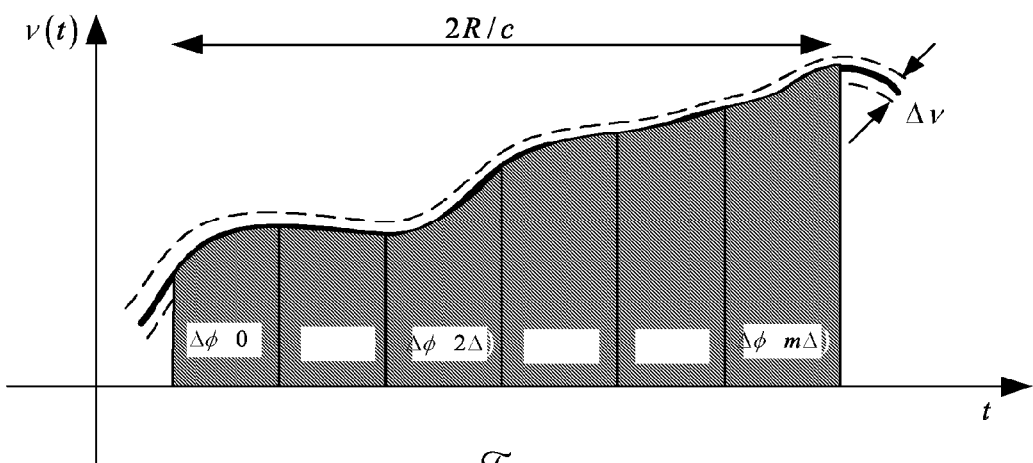
FIG. 5 shows the diagram of the frequency response curve of the virtual interferogram.

FIG. 5 shows the diagram of the frequency response curve of the virtual interferogram. According to the invention, the equivalent measured data of a length corresponding to the measuring distance is produced synthetically from the measurement of the phase curve data of the reference interferometer with a short length. In the simplest embodiment, $$\Delta\phi_{m\cdot r}(t_k) = \alpha \cdot \sum_{j=k-m+1}^{k} \Delta\phi_r(t_j)$$

is calculated as the sum of the individual phase intervals of the reference measurement, where $R\approx m\cdot\alpha\cdot R_r$. An example of the composition of the phases of such a virtual interferogram is shown by the frequency response curve in FIG. 5.

Figure 6:
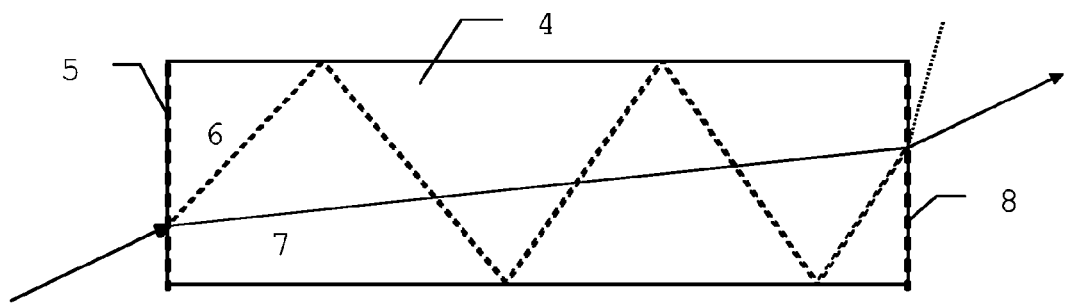
FIG. 6 shows the schematic diagram of a first embodiment of the reference element.

FIG. 6 schematically shows a first embodiment of the reference element for determining the reference length. The interferometer is completely integrated into a Zerodur block 4. Mounted on the entry window is a first grating 5, which can be supplemented by a further grating 8 on the exit side. The incident beam is split into two beam paths which correspond to extremes of zeroth and first order. The first beam path 7 of zeroth order propagates directly through the Zerodur block 4, whereas the second beam path 6 of first order has a plurality of (total) reflections at the interfaces of the Zerodur block. By exact dimensioning, it is possible to achieve overlap of the two beam paths phase-shifted relative to one another at the exit window. On superposition after emergence, the path difference between the beam paths gives a heterodyne signal having a known frequency from the material measure of the Zerodur block. The radiation can be recorded by a detector and further processed. By means of the Zerodur material, considerable independence from temperature influences can be achieved. Because of the gratings which can be applied, for example, lithographically, beam guidance can be realised exclusively in a compact and temperature-stable Zerodur block 4. In addition to the two-dimensional separation, it is also possible to realise a three-dimensional splitting with propagation directions and beam paths in three axes.

Figure 7:
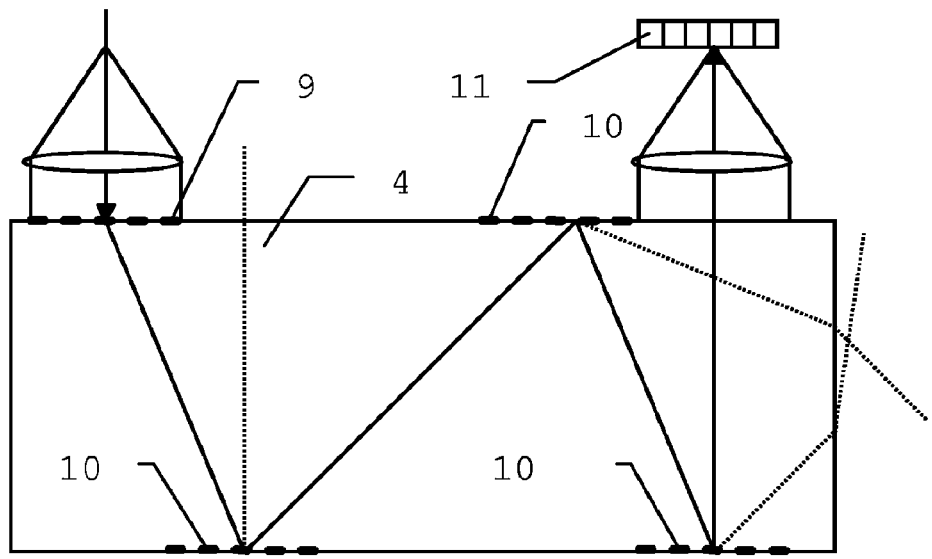
FIG. 7 shows the schematic diagram of a second embodiment of the reference element.

FIG. 7 schematically illustrates a second embodiment of the reference element having a photodetector, on which a beam path is guided with multiple diffraction. This reference element is suitable in particular for narrow wavelength ranges. The basis for realisation is once again a Zerodur block 4', on or in the surface of which a first grating 9 and optionally further gratings 10, 10', 10" are present. In this embodiment, the angle of the beam guidance is the sensitive information. In the arrangement shown, the diffraction angle at 1 μm wavelength in Zerodur is 22.5°, which corresponds to a grating period of about 4.2 μm. The required resolution (1 ppm) determines the width of the illuminated grating section. After the four diffractions shown here by way of example, the image is fed to the detector arrangement. The detector is read out at about 100 MHz. Each measuring point represents an instantaneous recording of the wavelength during the tuning of the laser.

Figure 8:
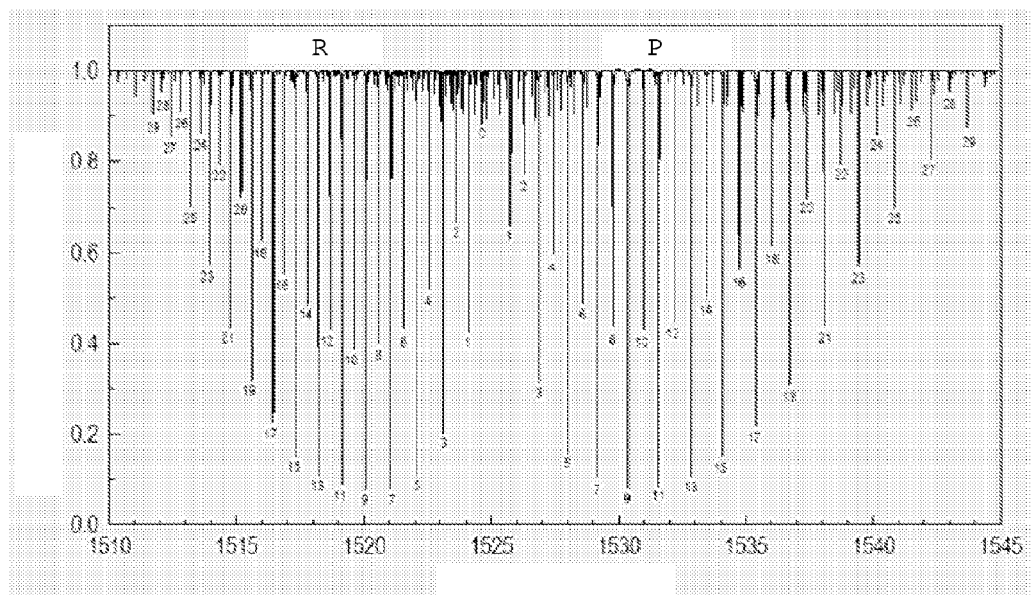
FIG. 8 shows the diagram of the absorption spectrum of acetylene.
Figure 9:
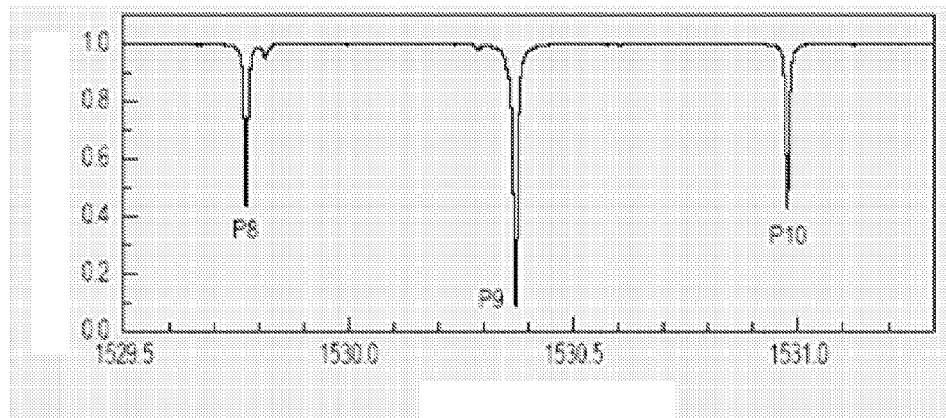
FIG. 9 shows the diagram of a section of the absorption spectrum of acetylene and FIG. 10 the schematic diagram of a complete fibre-optic design of measuring and reference interferometer, including a reference element for calibrating the reference length.

FIG. 8-FIG. 9 illustrates a gas cell as a third embodiment of the reference element. This embodiment utilizes a natural wavelength reference which is defined by the absorption in a medium, comparable with the stabilization in an HeNe laser. For example, acetylene gas cells which are commercially available as components can be used for this purpose. The region of use is at 1540 nm with line widths of 0.1 pm. In the case of tuning above 1 nm (120 GHz), 2-3 transitions of high accuracy can be used, so that a very precise determination of the laser wavelength and hence calibration of the reference interferometer can be effected. Owing to the atomic nature of the transitions, temperature-dependent influences can be neglected.

Specifically, FIG. 8 shows the diagram of the absorption spectrum of acetylene and FIG. 9 the diagram of a section of the absorption spectrum of acetylene.

Figure 10:
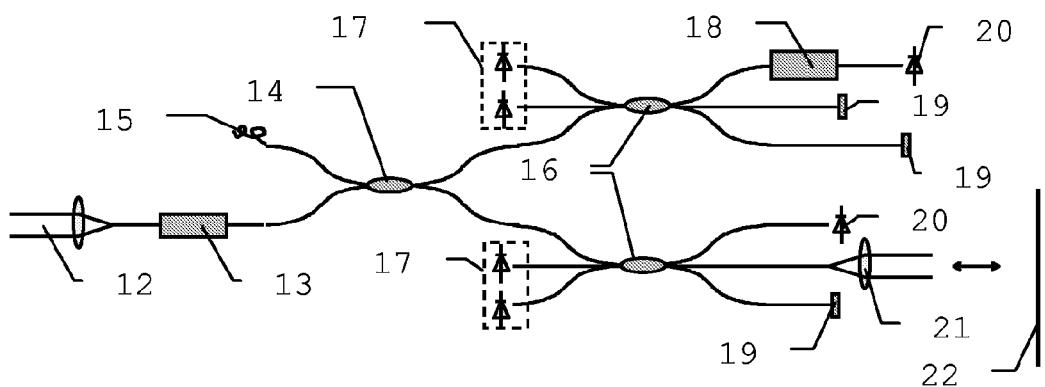

FIG. 10 illustrates the use of a gas cell of the third embodiment of the reference element within a complete fibre-optic setup. Light of the laser source 12 is passed through an optical isolator 13 in order to avoid external feedbacks. After the isolator 13, the light is coupled asymmetrically (10 dB coupler) in a first beam splitter 14 into two interferometers, one output ending in a terminating piece 15. The two interferometers in turn each have a 3×3 coupler 16 which produces a phase shift between the two detectors which in each case form one of the two coordinated quadrature receivers 17. The gas cell 18 is arranged in one of the two interferometers. Farady mirrors 19-19" in the two reference interferometers produce an orthogonally polarized reflected wave having 100% modulation depth on superposition. By implementation by means of fibres, a good overlap of the radiation is achieved without orientation or adjustment requirements. The single-mode characteristic permits the emission of flat wave fronts via a transmission optical system 21 for surveying a target 22. Two photodiodes 20' serve for monitoring.

What is claimed is:

1. Absolute distance-measuring method comprising the steps:
   emission of chirped electromagnetic radiation, in particular laser light,
     to at least one target to be surveyed and
     over at least one reference length,
   reception of the radiation scattered back from the target and of the radiation passed via the reference length,
   conversion of the received radiation into signals, in particular with interferometric mixing,
   determination of at least one distance to the at least one target from the signals,
   a digitized first interferogram of the radiation scattered back from the target and a digitized second interferogram of the radiation passed over the reference length being recorded during reception,
   wherein a virtual interferogram or the phase curve $\Delta\phi_{m \cdot r}(t_k)$ of the virtual interferogram is synthesized from phase curve data of the second interferogram, the determination of the at least one distance being effected by comparison of the phase curve data of the first interferogram with the phase curve data of the virtual interferogram.

2. Absolute distance-measuring method according to claim 1, wherein the virtual interferogram is synthesized from the phase curve data of the second interferogram in a manner such that it is correlated with the first interferogram and the disturbing influence of phase curve fluctuations on the distance determination is suppressed thereby.

3. Absolute distance-measuring method according to claim 1, wherein the reference length has a known ratio $\alpha$ to the sampling interval of the first digitized interferogram, in particular in that the sampling interval of the lag time $\tau_r$ corresponds to the reference length $R_r$ according to $R_r = c \cdot \tau_r / 2$, where c designates the velocity of light.

4. Absolute distance-measuring method according to claim 1, wherein the phase curve of the virtual interferogram is formed according to $$\Delta\phi_{m \cdot r}(t_k) = \alpha \cdot \sum_{j=k-m+1}^{k} \Delta\phi_r(t_j)$$

or $$\Delta\phi_{m \cdot r}(t_k) = \alpha \cdot \left[ \sum_{j=k-m+1}^{k} \Delta\phi_r(t_j) + \frac{R - m \cdot \alpha \cdot R_r}{\alpha \cdot R_r} \Delta\phi_r(t_{k-m}) \right]$$

where
$R_r$ designates the reference length,
M∈N designates the integral part of the ratio between reference length and measured distance according to $R \approx m \cdot \alpha \cdot R_r$, such that $(m-1) \cdot \alpha \cdot R_r \leq R \leq m \cdot \alpha \cdot R_r$, $$\Delta\phi_r(t_k) = 2\pi \cdot \int_{t_k - \tau_r}^{t_k} v(t) dt$$

designates the phase curve of the second interferogram, and
$\alpha \approx 1$ designates a correction factor modelling the deviation between sampling interval and lag time of the reference length.

5. Absolute distance-measuring method according to claim 1, wherein the virtual interferogram or the phase curve $\Delta\phi_{m \cdot r}(t_k)$ of the virtual interferogram is interpolated polynomially.

6. Absolute distance-measuring method according to claim 1, wherein the determination of the distance is effected by optimization for
   phase curve data of the first interferogram and
   phase curve data of the virtual interferogram,
   in particular with the use of the relationship $$\min_{R, \tilde{m}} \left[ \frac{\tilde{R}}{\tilde{m} \cdot \alpha \cdot R_r} \Delta\phi_{m \cdot r}(t) - \Delta\phi_M(t) \right]^2$$

where $$\Delta\phi_M(t_k) = 2\pi \cdot \int_{t_k - \tau_m}^{t_k} v(t) dt$$

designates the phase curve of the first interferogram, $$\Delta\phi_{m \cdot r}(t_k) = \alpha \cdot \sum_{j=k-m+1}^{k} \Delta\phi_r(t_j)$$

designates the phase curve of the virtual interferogram with $$\Delta\phi_r(t_k) = 2\pi \cdot \int_{t_k-\tau_r}^{t_k} v(t)dt$$

as the phase curve of the second interferogram, v(t) designates the given frequency response curve of the emitted radiation, $R_r$ designates the reference length, $\tilde{R}$ designates the distance to be determined, m∈N designates the integral part of the ratio between reference length and measured distance according to $R \approx m \cdot \alpha \cdot R_r$, corrected by a correction factor $\alpha \approx 1$ modelling the deviation between sampling interval and lag time of the reference length.

7. Absolute distance-measuring method according to claim 1, wherein the determination of the distance is effected by an optimization for the measured signal amplitudes of the first interferogram, in particular with the use of the relationship $$\min_{\tilde{A}, \tilde{R}, \tilde{m}} \left[ \tilde{A} \cdot \gamma(t) \cdot \cos\left( \frac{\tilde{R}}{\tilde{m} \cdot \alpha \cdot R_r} \Delta\phi_{m \cdot r}(t) \right) - s(t) \right]^2$$

where s(t) designates the signal amplitude of the first interferogram, $\tilde{A}$ designates the estimated signal strength of the first interferogram, γ(t) designates an optional measurement of the intensity curve of the emitted laser light as a function of time, which can be set as γ(t)=1 in the case of output power which is known to be constant, $$\Delta\phi_{m \cdot r}(t_k) = \alpha \cdot \sum_{j=k-m+1}^{k} \Delta\phi_r(t_j)$$

designates the phase curve of the virtual interferogram with $$\Delta\phi_r(t_k) = 2\pi \cdot \int_{t_k-\tau_r}^{t_k} v(t)dt$$

as the phase curve of the second interferogram, v(t) designates the given frequency response curve of the emitted radiation, $R_r$ designates the reference length, $\tilde{R}$ designates the distance to be determined, m∈N designates the integral part of the ratio between reference length and distance according to $R \approx m \cdot \alpha \cdot R_r$, corrected by a correction factor $\alpha \approx 1$ modelling the deviation between sampling interval and lag time of the reference length.

8. Absolute distance-measuring method according to claim 1, wherein the determination of the distance on movement of the measured object is effected by an optimization for
 phase curve data of the first interferogram and
 phase curve data of the first of the virtual interferogram,
in particular, in the case of a measuring interferometer signal strongly contaminated with noise, with the use of the relationship $$\min_{\tilde{R}, \tilde{\theta}, \tilde{m}} \left[ \frac{\tilde{R}}{\tilde{m} \cdot \alpha \cdot R_r} \Delta\phi_{m \cdot r}(t) - \Delta\phi_M(t) + 2\pi \frac{V(t; \tilde{\theta}) \cdot t}{\lambda} \right]^2$$

or $$\min_{\tilde{A}, \tilde{R}, \tilde{\theta}, \tilde{m}} \left[ \tilde{A} \cdot \cos\left( \frac{\tilde{R}}{\tilde{m} \cdot \alpha \cdot R_r} \Delta\phi_{m \cdot r}(t) + 2\pi \frac{V(t; \tilde{\theta}) \cdot t}{\lambda} \right) - s(t) \right]^2$$

where $$\Delta\phi_M(t_k) = 2\pi \cdot \left[ \int_{t_k-\tau_m}^{t_k} v(t)dt + \frac{V \cdot t}{\lambda} \right]$$

designates the phase curve of the first interferogram, $\Delta\phi_{m \cdot r}(t_k)$ designates the phase curve of the virtual interferogram with $$\Delta\phi_r(t_k) = 2\pi \cdot \int_{t_k-\tau_r}^{t_k} v(t)dt$$

as the phase curve of the second interferogram, s(t) designates the signal amplitude of the first interferogram, $\tilde{A}$ designates the estimated signal strength of the first interferogram, v(t) designates the given frequency response curve of the emitted radiation, $R_r$ designates the reference length, $\tilde{R}$ designates the distance to be determined, $V(t; \bar{\theta})$ designates a movement model of the target to be surveyed, with the velocity parameters $\bar{\theta}$, $\tilde{m}$ m∈N designates the integral part of the ratio between reference length and measured distance according to $R \approx m \cdot \alpha \cdot R_r$, corrected by a correction factor $\alpha \approx 1$ modelling the deviation between sampling interval and lag time of the reference length.

9. Absolute distance-measuring method according to claim 6, wherein the optimization is effected as an approximation, in particular by
 a simplified movement model of constant velocity θ=v, with V(t;θ)=v,
 a sequential determination of the integral relation $\tilde{m}$ and of the distance $\tilde{R}$ to be determined,
 dispensing with the determination of the variation of the emitted laser light γ(t) as a function of time,
 an optimization for the difference phases $\Delta\phi_M(t_k) - \Delta\phi_M(t_{k-1})$ and $\Delta\phi_{m \cdot r}(t_k) - \Delta\phi_{m \cdot r}(t_{k-1})$ instead of an optimization for the phase curve data.

10. Absolute distance-measuring method according to claim 1, wherein the calibration of the reference length is effected, in particular by means of a temperature-stable or temperature-stabilized reference element.

11. Computer program product with program code, which is stored on a machine-readable medium or is embodied by an electromagnetic wave, for carrying out the method according to claim 1, in particular if the program is executed in a computer.

12. Absolute distance-measuring apparatus for carrying out the method according to claim 1, comprising at least:
- a modulatable radiation source for generating and for emitting radiation, in particular of a tuneable laser source, to a target to be surveyed,
- a reference length,
- a signal generator for modulating the radiation source,
- a detector for receiving and for converting the interferogram of the back-scattered radiation into signals,
- a signal processor, in particular a digital signal processor, FPGA or ASIC, for processing the signals,
- in particular comprising a mixer, preferably a quadrature receiver, for carrying out a heterodyne mixing method,
- detector and signal processor being arranged and designed so that a first digitized interferogram of radiation scattered back from the target and a second interferogram of radiation passed via the reference length can be recorded,
- wherein detector and signal processor are arranged and designed so that a virtual interferogram or the phase curve $\Delta\phi_{m\cdot r}(t_k)$ of the virtual interferogram can be synthesized from phase curve data of the second interferogram.

13. Absolute distance-measuring apparatus according to claim 12, wherein the reference length is calibrated by a temperature-stable or temperature-stabilized reference element.

14. Absolute distance-measuring apparatus according to claim 13, wherein the reference element is a gas cell, in particular with acetylene filling.

15. Absolute distance-measuring apparatus according to claim 13, wherein the reference element is a temperature-stabilized etalon.

16. Absolute distance-measuring apparatus according to claim 13, wherein the reference element is a Zerodur block having a first grating on the entry surface for diffractive separation of an incident beam and a second grating on the exit surface for combination of the separate beam paths with a beam path difference which leads to a heterodyne signal of defined period.

17. Absolute distance-measuring apparatus according to claim 13, wherein the reference element is a Zerodur block having at least one grating for diffractive, wavelength-dependent beam guidance to a detector arrangement which permits the determination of the wavelength of the signal source.

18. Absolute distance-measuring method according to claim 7, wherein the optimization is effected as an approximation, in particular by
- a simplified movement model of constant velocity $\theta=v$, with $V(t;\theta)=v$,
- a sequential determination of the integral relation $\tilde{m}$ and of the distance $\tilde{R}$ to be determined,
- dispensing with the determination of the variation of the emitted laser light $\gamma(t)$ as a function of time,
- an optimization for the difference phases $\Delta\phi_M(t_k)-\Delta\phi_M(t_{k-1})$ and $\Delta\phi_{m\cdot r}(t_k)-\Delta\phi_{m\cdot r}(t_{k-1})$ instead of an optimization for the phase curve data.

19. Absolute distance-measuring method according to claim 8, wherein the optimization is effected as an approximation, in particular by
- a simplified movement model of constant velocity $\theta=v$, with $V(t;\theta)=v$,
- a sequential determination of the integral relation $\tilde{m}$ and of the distance $\tilde{R}$ to be determined,
- dispensing with the determination of the variation of the emitted laser light $\gamma(t)$ as a function of time,
- an optimization for the difference phases $\Delta\phi_M(t_k)-\Delta\phi_M(t_{k-1})$ and $\Delta\phi_{m\cdot r}(t_k)-\Delta\phi_{m\cdot r}(t_{k-1})$ instead of an optimization for the phase curve data.

* * * * *